(12) United States Patent
Burg (10) Patent No.: US 6,981,461 B1
(45) Date of Patent: Jan. 3, 2006

(54) AMPHIBIOUS HIGH SPEED MARINE VEHICLE

(76) Inventor: Donald E. Burg, 15840 SW. 84 Ave., Miami, FL (US) 33157

( * ) Notice: Subject to any disclaimer, the term of this patent is extended or adjusted under 35 U.S.C. 154(b) by 0 days.

(21) Appl. No.: 10/924,312

(22) Filed: Aug. 23, 2004

(51) Int. Cl.
*B63B 1/34* (2006.01)
(52) U.S. Cl. .................. 114/67 R; 440/12.63
(58) Field of Classification Search .............. 114/67 A, 114/67 R, 61.1, 344; 440/5, 12.5, 12.51, 440/12.63
See application file for complete search history.

(56) References Cited

U.S. PATENT DOCUMENTS

| | | | | | |
|---|---|---|---|---|---|
| 3,698,350 | A | * | 10/1972 | Gehlen | 440/12.52 |
| 3,951,093 | A | * | 4/1976 | Poche | 440/12.63 |
| 3,968,766 | A | * | 7/1976 | House | 440/12.67 |
| 4,175,636 | A | * | 11/1979 | Broughton | 180/119 |
| 5,727,494 | A | * | 3/1998 | Caserta et al. | 114/55.51 |

* cited by examiner

*Primary Examiner*—Stephen Avila

(57) ABSTRACT

Presented in an advanced high speed air cushioned marine vehicle that incorporates retractable land drives for operation over beaches or other hard surfaces. The land drives retract into air cushion hull recesses when the vehicle is waterborne so as not to add water resistance at high waterborne speeds. Power for water propulsion as well as land drive is normally supplied from the same propulsor motor(s) for simplicity. Land drives may incorporate tracks, tires, or other land contact mechanisms.

56 Claims, 4 Drawing Sheets

AMPHIBIOUS HIGH SPEED MARINE VEHICLE

BACKGROUND OF THE INVENITON

There is a need for high speed marine vehicles that are beachable to allow discharge of troops and cargo. The Navy's LCU (Landing Craft Utility) has a top speed of about 12 knots is beachable but not amphibious. The Navy has made an attempt in the last few years to update the LCU concept with a new design, dubbed the LCU(R) for LCU (Replacement), to gain more speed. The desire for more speed appears to have been unsuccessful since the design specifications for the LCU(R) have recently been changed to drop the speed requirement from its original 45 knots to a maximum of only 15 knots. This low speed is undoubtedly a problem when one realizes that today's supply ships are required to be at least a hundred miles offshore to help insure their safety from shore based missile attacks. Twelve knots requires a minimum of over eight hours transit time.

An alternative is the LCAC (Landing Craft Air Cushion) that is not only beachable but also amphibious. The LCAC is supported by a blower pressurized air cushion. The LCAC has a full 360 degree peripheral flexible skirt that attaches to the underside of its hull and restrains the air cushion between the hull and a water or land surface. The LCAC and its like are many times referred to as hovercraft. The LCAC has a number of inherent disadvantages, to wit: 1) It does not handle rough seas well, 2) It has an inherent rough "cobblestone" ride due to pressure perturbations in its air cushion where the pressure perturbations are mainly attributed to its full 360 degree flexible seals, 3) It is very weight sensitive, 4) It can only access beachheads that have gently sloped beaches, 4) Its full 360 degree flexible seals are expensive initially and to maintain, 6) Largely due to its need for power from three 4,500 HP gas turbines that supply propulsion and blower power, it is expensive initially with a current price of over $20 million, and 7) It is very noisy due to its necessary air propellers. In spite of these shortcomings the LCAC has been procured in reasonably large numbers due to its very valuable amphibious and 45 knot speed capabilities. The amphibious capability allows driving up onto a beach and discharging troops and cargo on dry land above the surf line.

There is also the recently developed Marine AAAV (Armored Amphibious Assault Vehicle). This is basically a small tank that is designed to also operate in a water environment. It requires a tremendous amount of propulsive power when waterborne since its tank tracks are in water contact at all speeds hence giving the AAAV a very high water drag component. Top speed waterborne is only about 25 knots. Also, due to its rather boxy tank-like shape and heavy weight, it is not capable of operating in heavy seas.

The current Navy/Marine Sea Basing program has pointed out the need for beachable high speed marine transports that are referred to as HSCs (High Speed Connectors). The concept behind Sea Basing is to have large supply ships positioned about 200 miles offshore with troops, supplies, vehicles, etc. transported to beachheads by the HSCs. Some of Applicant's other patent application(s) address this need in the form of large beachable air cushioned marine vehicles. These inventive concepts of Applicant are mostly related to the SeaCoaster® SECAT (Surface Effect CATamaran) high speed marine vehicle.

The instant invention advanced marine vehicle proposed herein offers very high speed at high efficiency and excellent seakeeping as a marine vehicle as well as amphibious capability. It combines high efficiency and high speed air cushioned marine hull technology with retractable land drives. It does this while also offering low initial and maintenance costs. It finds application, as an advanced high speed and very seaworthy vessel that is also amphibious, to a variety of programs. This includes the LCU(R) program, a second generation high speed AAAV type vehicle that is not only amphibious but also an excellent rough sea vessel and would offer waterborne speeds in excess of 50 knots with similar installed power to the 25 knot AAAV, and the Sea Basing program as an amphibious HSC. There are also other applications besides military as commercial and pleasure craft plus heretofore unrealized applications will surface as the technology becomes widely known.

SUMMARY OF THE INVENTION

It is a primary object of the invention to offer an advanced air cushioned marine vehicle that has excellent seakeeping when waterborne and is convertible to an amphibious operation configuration when beachheads are encountered.

It is a related object of the invention that it include a land transport means that is, at least partially, retractable into an air cushion recess disposed in the advanced marine vehicle.

It is a directly related object of the invention that, when at least partially retracted into an air cushion recess with the air cushion pressurized with gas and the vehicle moving forward at high speed on a water surface, the land transport means have little or no water contact so as to reduce or eliminate water related drag.

It is a further related object of the invention that when the land transport means, when the advanced marine vehicle encounters a beachhead, is extendable downward to make land contact and thereby provide overland support for the advanced amphibious marine vehicle.

It is yet another object of the invention that the land transport means may, at least in part, retract aft into the gas cushion recess during high speed waterborne operation of the advanced amphibious marine vehicle.

It still another object of the invention that the land transport means may, at least in part, retract forward into the gas cushion recess during high speed waterborne operation of the advanced marine vehicle.

It is another object of the invention that it may include more than one air cushion and more than one air cushion recess.

It is a related object of the invention that it may include more than one land transport means.

It is yet another object of the invention that the land transport means include land contact means including a track wherein said track makes land contact during beaching operation of the vehicle.

It is yet another object of the invention that the land transport means may include a tire that makes land contact during beaching operations.

Another object of the invention is that land transport means maybe, at least partially, energized by power takeoff means from a marine propulsion system.

A directly related object of the invention is that the power takeoff means includes a hydraulic pressure generator.

Another object of the invention is that drive energy for the land transport means is, at least in part, from a hydraulic motor disposed, at least in part, internal to the land transport means.

A directly related object of the invention is that drive energy for the land transport means includes a hydraulic drive motor wherein said hydraulic drive motor powers a track drive gear.

Yet another object of the invention is that drive energy for the land transport means includes a hydraulic drive motor wherein said hydraulic drive motor powers a tire.

Another object of the invention is that a land transport means be steerable.

A further object of the invention is that, during high speed waterborne operation with its gas cushion pressurized, said vehicle is, at least in part, propelled by a water propulsor energized with power supplied by a propulsor drive motor and propelled when land borne, at least in part, by its land transport means wherein said land transport means is energized with power supplied by the propulsor drive motor.

Another related object of the invention is that a propulsor motor drives a gearbox with output from said gearbox driving a water propulsor and a hydraulic pressure generator that supplies hydraulic power to a hydraulic drive blower motor when the vehicle is waterborne and wherein said hydraulic pressure generator supplies hydraulic power to drive a land transport means hydraulic drive motor when the vehicle is land borne.

It is a further object of the invention that it may include port and starboard side land transport means in a single air cushion recess.

It is a directly related object of the invention that there by be fore and aft port and starboard land transport means in a single air cushion recess.

It is yet another object of the invention that it may have solid structure seals around its pressurized air cushion(s) or may have a combination of solid structure and flexible or moveable, in relation to the vehicle, seals around the air cushon(s).

BRIEF DESCRIPTION OF THE FIGURES

FIG. 4 is a profile view of the instant invention amphibious high speed marine vehicle when operating in its land borne mode with its land drives or land transport means down and in land contact for over land transit. It is to be noted that the term land here is meant to include any hard surface and may include a ramp on a ship, a portion of a dock, portions of pontoon bridges or other bridge types, beach matting, or the like.

DETAILED DESCRIPTION

Figure 1:
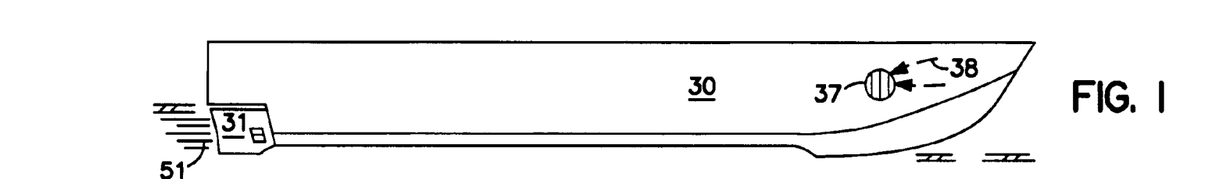
FIG. 1 presents a profile view of the instant invention amphibious high speed marine vehicle when it is operation at high speed on a calm sea surface. High speed is defined herein as speeds of 15 knots or more.

FIG. 1 presents a profile view of the instant invention amphibious high speed marine vehicle 30 when it is operation at high speed on a calm sea surface as noted by waterlines 40. Also shown are a gas cushion pressurizing blower inlet opening 37, air flow arrows 38, water propulsor 31, and water propulsor water jet discharge 51.

Figure 2:
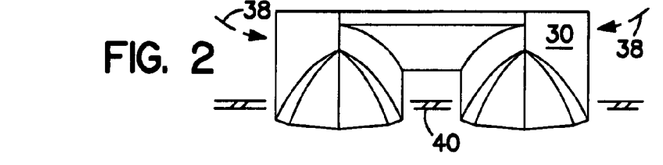
FIG. 2 is a bow view of the instant invention vehicle from FIG. 1.

FIG. 2 is a bow view of the instant invention amphibious marine vehicle 30 from FIG. 1.

Figure 3:
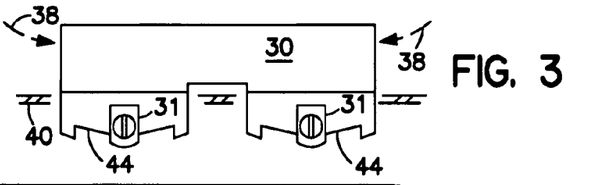
FIG. 3 presents a stern view of the instant invention vehicle of FIG. 1.

FIG. 3 presents a stern view of the instant invention amphibious marine vehicle 30 of FIG. 1. Preferred embodiments of gas cushion recess stern seals 44, as they appear at the stern in this example, are also shown.

Figure 4:
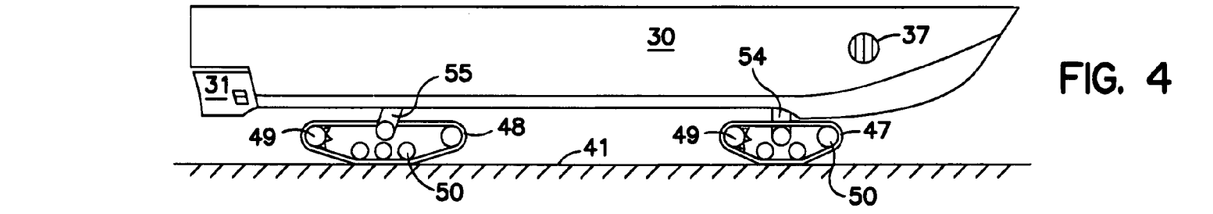

FIG. 4 is a profile view of the instant invention amphibious high speed marine vehicle 30 when operating land borne with two of its land drives or land transport means, in this example a forward land transport means 47 and a stern land transport means 48 are shown, down and in land contact for over land transit. A land surface 41 is shown. It is to be noted that the term land here is meant to include any hard surface and may include a ramp on a ship, a portion of a dock, portions of pontoon bridges or other bridge types, beach matting, or the like. Track drive systems include, in this preferred embodiment of the invention, powered drive gears 49, and follower rollers or track guides 50. It is important to note that other types of land contact means such as tires or the like may be used and, although not shown herein, are considered within the spirit and scope of the invention as are drive motors such as hydraulic motors, normally used to drive the powered drive gears 49, tires, or other means of land contact.

Figure 5:
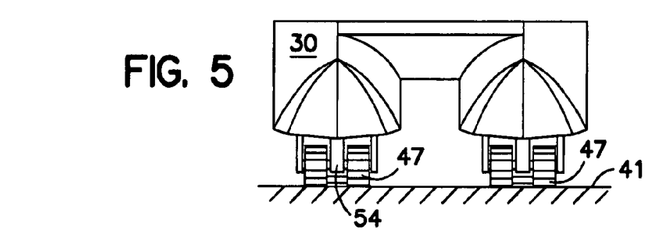
FIG. 5 gives a bow view of the instant invention vehicle of FIG. 4.

FIG. 5 gives a bow view of the instant invention amphibious marine vehicle 30 of FIG. 4. A preferred embodiment forward attachment arm 54 for the forward land drive means 47 is shown. An advantage of the placement of the forward attachment arm 54 here is that it allows steering of the forward land drive means 47. It is important to note that, while track drives are shown throughout this application, that simpler wheeled drives such as tires are also within the scope of the invention. The track drives, while more complex, do offer advantages when transiting soft beaches or other difficult terrain.

Figure 6:
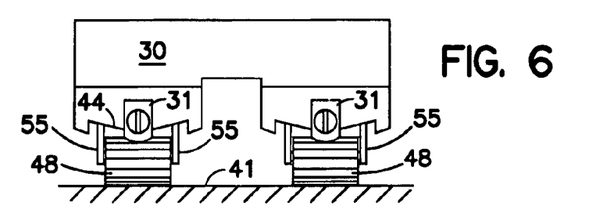
FIG. 6 presents a stern view of the instant invention vehicle of FIG. 4.

FIG. 6 presents a stern view of the instant invention vehicle of FIG. 4. Note the preferred embodiment parallel side that may be yoke like rear attachment arm 55 attached to the rear land drive means is shown here. This concept rear attachment arm 55 makes for a strong light weight rear attachment arm 55 that is not subject to twisting failure. Note that the yoke like attachment arm design can also be applied to the forward land drive means shown in FIG. 5.

Figure 7:
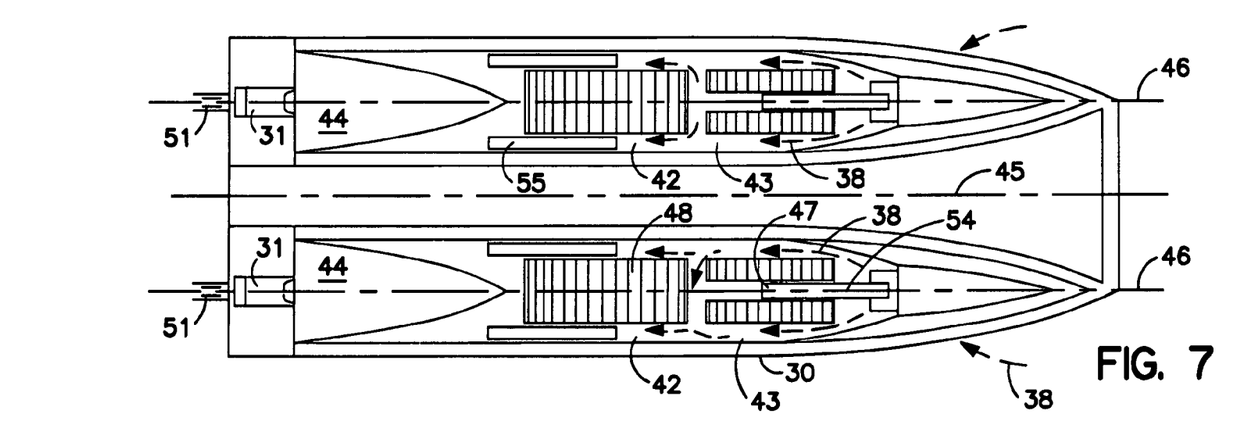
FIG. 7 is a bottom plan view of the instant invention vehicle of FIG. 1. The land drives are retracted upward into the gas cushion recesses here to minimize water contact during waterborne operation.

FIG. 7 is a bottom plan view of the instant invention amphibious marine vehicle 30 of FIG. 1. The land drives or land transport means 47, 48 are retracted upward into the gas cushion recess 43 here to minimize water contact during waterborne operation. This can be realized upon examination of the location of waterline 40 inside of the gas cushion recess 43. Vertical centerline plane 45 and vertical centerline planes 46 are also shown.

Figure 8:
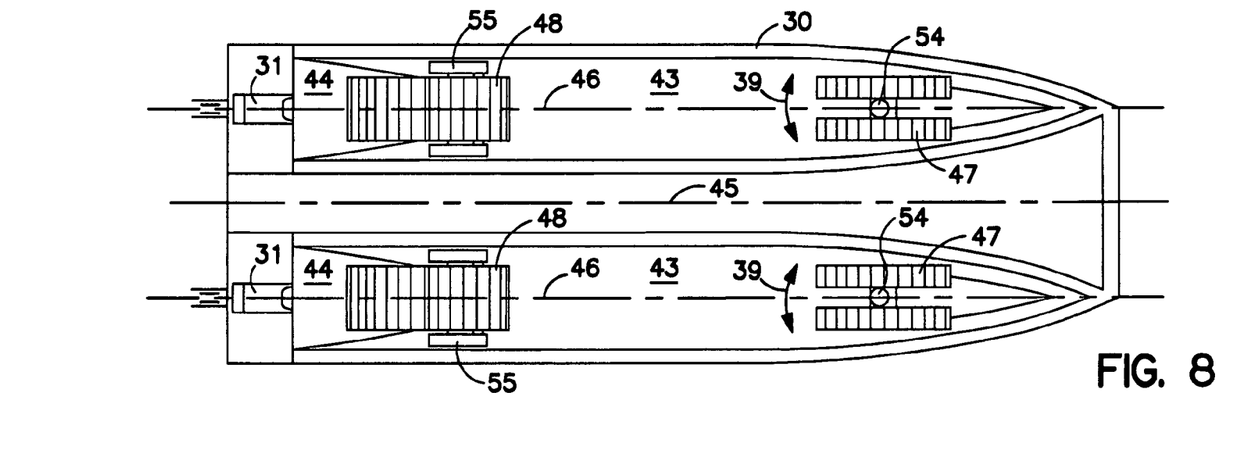
FIG. 8 shows a bottom plan view of the instant invention vehicle of FIG. 4. This shows the land drives extended downward for over land transit.

FIG. 8 shows a bottom plan view of the instant invention amphibious marine vehicle 30 of FIG. 4. This shows the land drives 47, 48 extended downward for over land transit. Note the rotation arrows 39 here that show how the forward land drives 47 may rotate for steering purposes. While two gas cushion recesses 43 are shown herein, it is to be noted that the instant invention concept can be employed on a vehicle with one or with more than two gas cushion recesses. In the case of a single wide gas cushion, it is preferable to have port and starboard side land transport means for stability when land borne. Also, while employment is shown herein on vehicle configurations that have fixed and not moveable in relation to a hull of the vehicle gas cushion recess seals, such as flexible gas cushion recess fore and/or aft gas cushion recess seals or hinged moveable rigid member type fore and/or aft gas cushion recess seals, there is no intention to limit the invention and use of moveable gas cushion recess seals, though not shown herein, is within the spirit and scope of the invention. When moveable air cushion recess seals are used, they are considered part of the boundary of the gas cushion recess.

Figure 9:
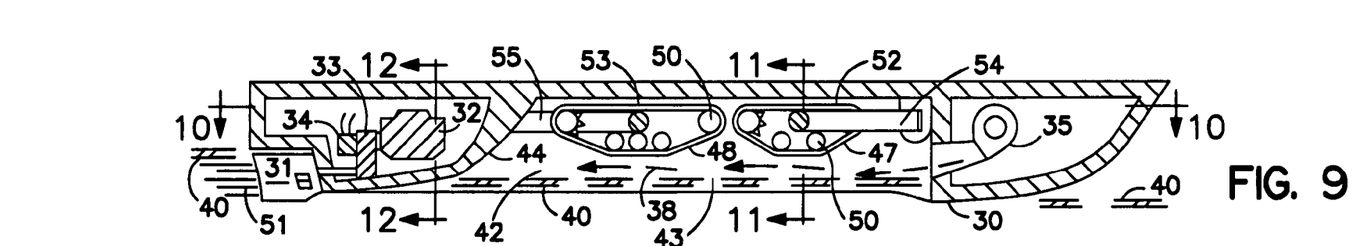
FIG. 9 presents a cross-section, as taken through vertical longitudinal plane 9—9 of FIG. 10, that shows a preferred embodiment arrangement of forward and aft land drives in their retracted positions. Note that the waterline in the gas cushion recess is well below the land drives shown here in this high speed waterborne operation case with the gas cushion(s) pressurized.
Figure 10:
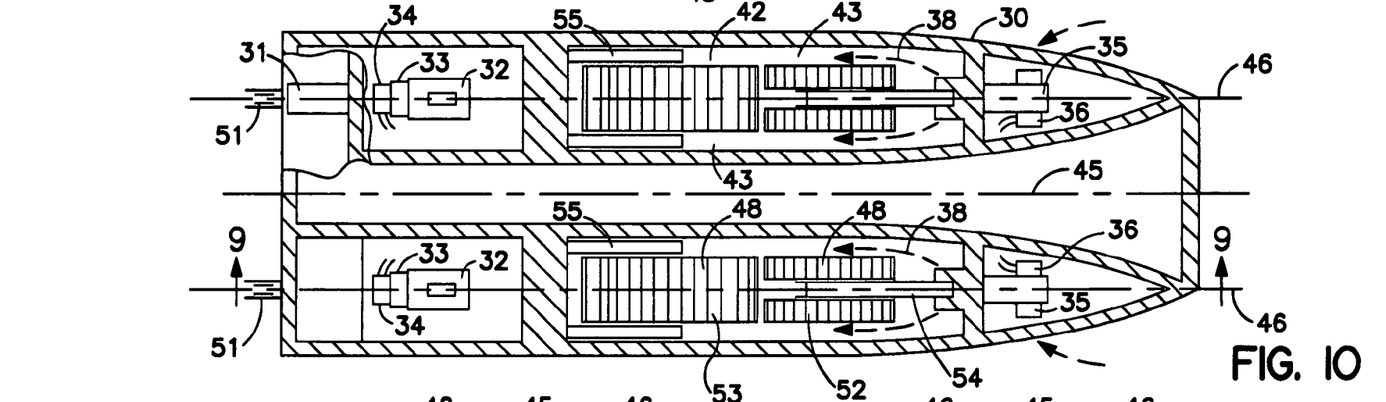
FIG. 10 gives a top plan view, as taken through horizontal plane 10—10 of FIG. 9, that shows machinery arrangements. Note the blower(s) that supply pressurized air to the gas cushion recess(es) and the propulsion engines and drives.

FIG. 9 presents a cross-section, as taken through vertical longitudinal plane 9—9 of FIG. 10, that shows a preferred embodiment of forward and aft land drives 47, 48 in their retracted positions. Note that the waterline 40 in the gas cushion recess 43 is below the land drives 47, 48 shown here in this high speed waterborne operation case with the gas cushion(s) 42 pressurized. A preferred embodiment propulsion motor 32, water propulsor 31, transmission 33, and hydraulic pressure generator 34 are shown in their preferred embodiment. Note that the hydraulic pressure generator 34 would supply hydraulic pressure energy to both the land drives 47, 48 and the air cushion blower 35 when called for in the preferred embodiment. Also, the transmission 33 would preferably be of a Forward-Neutral-Reverse (FNR) configuration with a direct drive line through to the hydraulic pressure generator 34 since hydraulic pressure output from that generator is required during both high speed waterborne and land borne operations. The advantage of having a reverse gear is mainly to expel any debris that may become entangled internal to the water propulsor out through a water inlet of the water propulsor.

FIG. 10 gives a top plan view, as taken through horizontal plane $10^{-10}$ of FIG. 9, that shows machinery arrangements. Note the blower(s) 35 that supply pressurized air to the gas cushion(s) 42 and the propulsion engine(s) 32 and water propulsors(s) 31.

Figure 11:
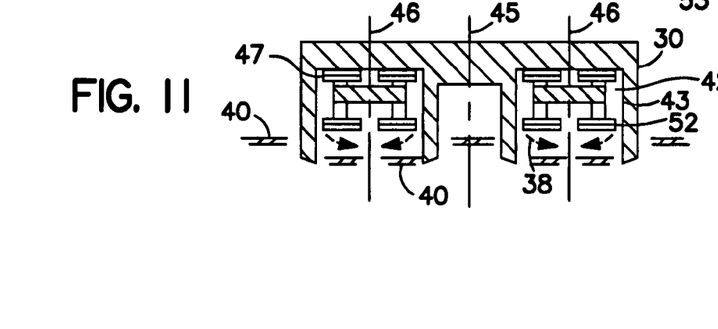
FIG. 11 is a cross-section, as taken through vertical plane 11—11 of FIG. 9, that shows structure and land drives in way of a forward portion of the gas cushion recess.

FIG. 11 is a cross-section, as taken through vertical transverse plane 11—11 of FIG. 9, that shows structure and land drive(s) 47 in way of a forward portion of the gas cushion recess.

Figure 12:
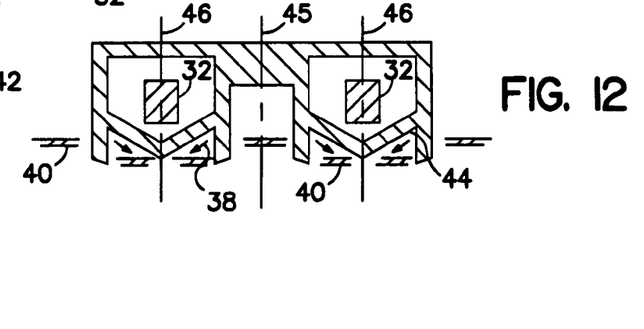
FIG. 12 presents a cross-section, as taken through vertical plane 12—12 of FIG. 9, that shows structure and propulsor engine(s) proximal an aft end of the gas cushion recess(es). Note the preferred V-shape of the gas cushion recess stern seal. This seal shape is desirable since it allows placement of propulsor engine(s) deep in the hull and helps to insure that mostly air free water will be supplied to the water propulsor.

FIG. 12 presents a cross-section, as taken through vertical transverse plane 12—12 of FIG. 9, that shows structure and propulsor engine(s) 32 proximal an aft end of the gas cushion recess(es). Note the preferred V-shape of the gas cushion recess stern seal 44. This seal shape is desirable since it allows placement of propulsor engine(s) deep in the hull and helps to insure that mostly air free water will be supplied to the water propulsor 32. Also, this shape of the stern seal(s) 44 insures good ride quality in rough seas.

Figure 13:
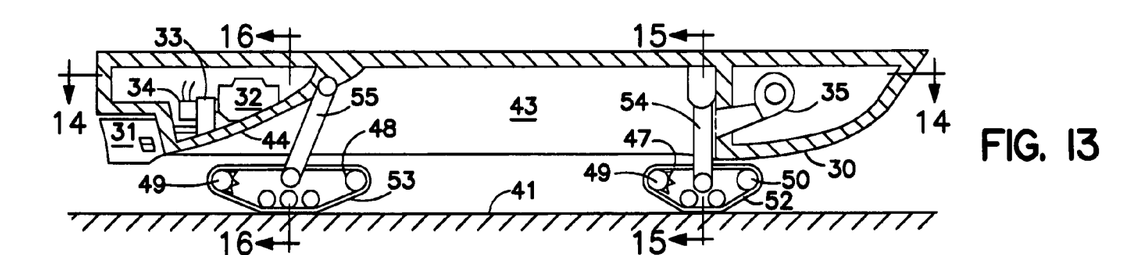
FIG. 13 presents a cross-section, as taken through vertical plane 13—13 of FIG. 14, that shows the land drives extended downward for land borne transit.
Figure 14:
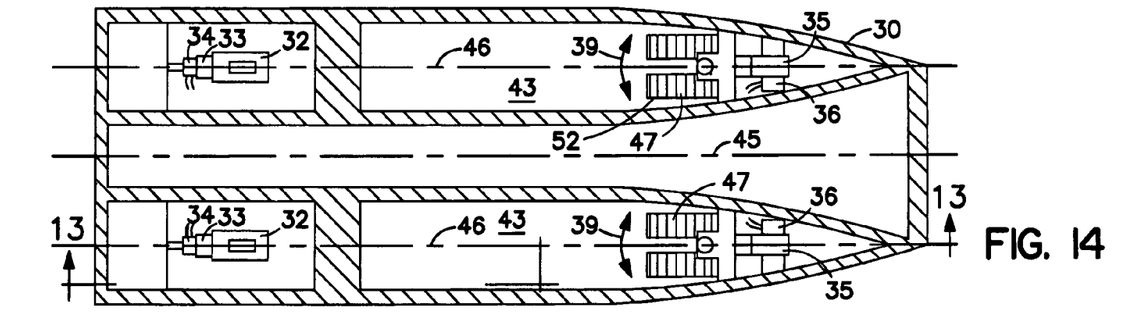
FIG. 14 is a top plan view, as taken through horizontal plane 14—14 of FIG. 13, that shows machinery arrangements in this land borne mode.

FIG. 13 presents a cross-section, as taken through vertical plane 13—13 of FIG. 14, that shows the land drives 47, 48 extended downward for land borne transit.

FIG. 14 is a top plan view, as taken through horizontal plane 14—14 of FIG. 13, that shows machinery arrangements in this land borne mode.

Figure 15:
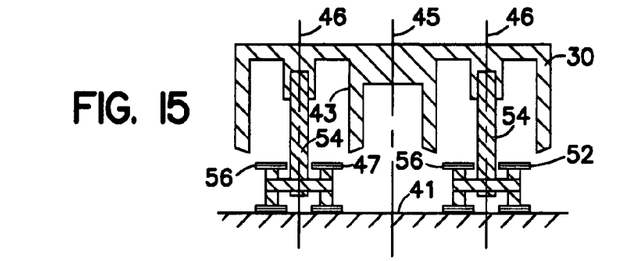
FIG. 15 is a cross-section, as taken through vertical plane 15—15 of FIG. 13, that shows a cross-section of structure proximal a forward portion of the gas cushion recess and of a forward land drive.

FIG. 15 is a cross-section, as taken through vertical plane 15—15 of FIG. 13, that shows a cross-section of structure proximal a forward portion of the gas cushion recess(es) 43 and of a forward land drive 47. The land contact track 56 is also shown.

Figure 16:
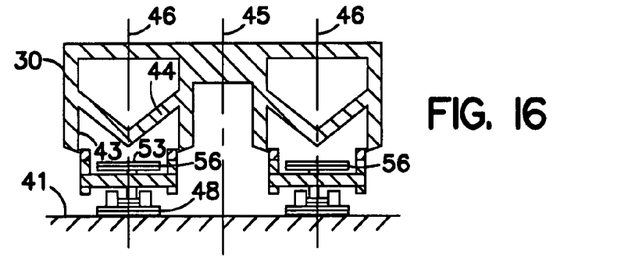
FIG. 16 presents a cross-section, as taken through vertical plane 16—16 of FIG. 13, that shows a cross-section of a rear land drive and of a gas cushion recess stern seal in its preferred embodiment that is, as seen in this vertical transverse plane of the vehicle, primarily of a V-shape.

FIG. 16 presents a cross-section, as taken through vertical plane 16—16 of FIG. 13, that shows a cross-section of a rear land drive 48 and of a gas cushion recess stern seal 44 in its preferred embodiment that is, as seen in this vertical transverse plane, primarily of a V-shape. Land contact track 56 is shown here as inboard of the yoke-like attachment arms 55 here. Whenever the term beachhead is used herein it is meant to refer not only to operation over and on beachheads but also to operations on or about ramps of ships, ramps embarking land areas, docks, or the like.

While a two water contacting air cushioned hull or catamaran air cushioned hull arrangement is depicted herein, it is important to note that there may be one, two, or more air cushioned hull members. Further, when only one air cushioned hull member is used it is normal to have a wider air cushion than one of the air cushions shown here. In such an instance, it may be desirable to have land drives either side of the air cushion for stability. This could easily result in a four or more land drive arrangement. In such a single air cushioned hull arrangement it is also probable that at least part of a forward air cushion recess seal would be a flexible seal member since such a wide blunt seal member would present a hard ride in rough seas if it were fixed and part of the hull structure.

While the invention has been described in connection with a preferred and several alternative embodiments, it will be understood that there is no intention to thereby limit the invention. On the contrary, there is intended to be covered all alternatives, modifications and equivalents as may be included within the spirit and scope of the invention as defined by the appended claims, which are the sole definition of the invention.

What I claim is:

1. In an advanced amphibious marine vehicle and including a first artificially pressurized gas cushion disposed in a first gas cushion recess wherein said first artificially pressurized gas cushion supports at least a portion of weight of the advanced amphibious marine vehicle when said advanced amphibious marine vehicle is moving forward at high speed on a water surface, the improvement comprising:

a first gas cushion recess first land transport means that, when the advanced amphibious marine vehicle is moving forward at high speed on a water surface with said first artificially pressurized gas cushion pressurized, is at least in part retracted into the first gas cushion recess to thereby reduce water contact of the first gas cushion recess first land transport means and wherein said first gas cushion recess first land transport means, when the advanced marine vehicle encounters a beachhead, is extendable downward to make land contact and thereby provide overland support for the advanced amphibious marine vehicle and which further comprises a second artificially pressurized gas cushion disposed in a second gas cushion recess wherein said second artificially pressurized gas cushion supports at least a portion of weight of the advanced amphibious marine vehicle when said advanced amphibious marine vehicle is moving forward at high speed on a water surface and a second gas cushion recess first land transport means that, when the advanced amphibious marine vehicle is moving forward at high speed on a water surface with said second artificially pressurized gas cushion pressurized, is at least in part retracted into the second gas cushion recess to thereby reduce water contact of the second gas cushion first land transport means and wherein said second gas cushion first land transport means, when the advanced marine vehicle encounters a beachhead, is extendable downward to make land contact and thereby provide overland support for the advanced amphibious marine vehicle.

2. The advanced amphibious marine vehicle of claim 1 which further comprises a first gas cushion second land transport means that, when the advanced amphibious marine vehicle is moving forward at high speed on a water surface with said first artificially pressurized gas cushion pressurized, is at least in part retracted into the first gas cushion recess to thereby reduce water contact of the first gas cushion second land transport means and wherein said first gas cushion recess second land transport means, when the advanced amphibious marine vehicle encounters a beachhead, is extendable downward to make land contact and thereby provide overland support for the advanced amphibious marine vehicle.

3. The advanced amphibious marine vehicle of claim 1 wherein drive energy for the first gas cushion recess first land transport means includes a hydraulic drive motor wherein said hydraulic drive motor Rowers a wheel like device.

4. The advanced amphibious marine vehicle of claim 1 which further comprises a second gas cushion recess second land transport means that, when the advanced amphibious marine vehicle is moving forward at high speed on a water surface with said second artificially pressurized gas cushion pressurized, is at least in part retracted into the second gas cushion recess to thereby reduce water contact of the second gas cushion recess second land transport means and wherein said second gas cushion second land transport means, when the advanced marine vehicle encounters a beachhead, is extendable downward to make land contact and thereby provide overland support for the advanced amphibious marine vehicle.

5. The advanced amphibious marine vehicle of claim 1 wherein said first gas cushion recess first land transport means retracts aft into the first gas cushion recess during high speed waterborne operation of the advanced amphibious marine vehicle.

6. The advanced amphibious marine vehicle of claim 1 wherein said first gas cushion recess first land transport means retracts forward into the first gas cushion recess during high speed waterborne operation of the advanced amphibious marine vehicle.

7. The advanced amphibious marine vehicle of claim 1 wherein said first gas cushion recess second land transport means retracts forward into the first gas cushion recess during high speed waterborne operation of the advanced amphibious marine vehicle.

8. The advanced amphibious marine vehicle of claim 1 wherein said first gas cushion recess first land transport means includes a track drive means wherein said track drive means makes land contact during beaching operation of the advanced amphibious marine vehicle.

9. The advanced amphibious marine vehicle of claim 1 wherein said first gas cushion recess first land transport means includes a tire drive means that makes land contact during beaching operations of the advanced amphibious marine vehicle.

10. The advanced amphibious marine vehicle of claim 1 wherein the first gas cushion recess first land transport means is, at least partially, energized by power takeoff means from a first marine propulsion system.

11. The advanced amphibious marine vehicle of claim 10 wherein the power takeoff means includes a hydraulic pressure generator.

12. The advanced amphibious marine vehicle of claim 1 wherein drive energy for the first gas cushion recess first land transport means is, at least in part, from a hydraulic motor disposed, at least in part, internal to the first gas cushion recess first land transport means.

13. The advanced amphibious marine vehicle of claim 1 wherein drive energy for the first gas cushion recess first land transport means includes a hydraulic drive motor wherein said hydraulic drive motor powers a track drive gear.

14. The advanced amphibious marine vehicle of claim 1 wherein said first gas cushion recess first land transport means is steerable.

15. The advanced amphibious marine vehicle of claim 1 wherein, during high speed waterborne operation with its first artificially pressurized gas cushion pressurized, said advanced amphibious marine vehicle is, at least in part, propelled by a first water propulsor energized with power supplied by a first propulsor motor and propelled when land borne, at least in part, by its first gas cushion recess first land transport means wherein said first gas cushion recess first land transport means is energized with power supplied by the first propulsor motor.

16. The advanced amphibious marine vehicle of claim 1 wherein a first propulsor motor drives a gearbox with output from said gearbox driving a first water propulsor and a first hydraulic pressure generator that supplies hydraulic power to a gas cushion pressurizing blower hydraulic drive motor when the advanced amphibious marine vehicle is waterborne and wherein said first hydraulic pressure generator supplies hydraulic power to drive a first gas cushion recess first land transport means hydraulic drive motor when the advanced amphibious marine vehicle is land borne.

17. The advanced amphibious marine vehicle of claim 1 wherein a seal member positioned proximal an aft end of the first gas cushion recess is, at least in its majority as seen in a vertical transverse plane of the advanced amphibious marine vehicle, V-shaped.

18. The advanced amphibious marine vehicle of claim 1 wherein attachment arms are disposed either side of the first gas cushion recess second land transport means.

19. The advanced amphibious marine vehicle of claim 1 wherein a portion of a boundary of the first gas cushion recess is composed of a moveable, in relation to a hull of the advanced amphibious marine vehicle, seal member.

20. The advanced amphibious marine vehicle of claim 19 wherein the moveable seal member is at least partially composed of flexible material.

21. In an advanced amphibious marine vehicle including a first artificially pressurized gas cushion disposed in a first gas cushion recess wherein said first artificially pressurized gas cushion supports at least a portion of weight of the advanced amphibious marine vehicle when said advanced amphibious marine vehicle is moving forward at high speed on a water surface, the improvement comprising:

a first gas cushion recess first land transport means that is, at least in its majority, retractable so as to reduce water contact when the advanced amphibious marine vehicle is moving forward at high speed on a water surface with said first artificially pressurized gas cushion pressurized and is extendable downward to make hard surface contact when the advanced amphibious marine vehicle encounters a hard surface thereby providing support for the advanced amphibious marine vehicle when said advanced amphibious marine vehicle is operating above the hard surface with its hull free of water contact and which further comprises a second gas cushion recess having a second gas cushion recess first land transport means wherein said second gas cushion recess first land transport means is, at least in its majority, retractable into the second gas cushion recess.

22. The advanced amphibious marine vehicle of claim 21 wherein said first gas cushion recess first land transport means is, at least in its majority, retractable into the first gas cushion recess.

23. The advanced amphibious marine vehicle of claim 21 which further comprises a first gas cushion recess second land transport means wherein said first gas cushion recess second land transport means is, at least in its majority, retractable into the first gas cushion recess.

24. The advanced amphibious marine vehicle of claim 21 which further comprises a second gas cushion recess second land transport means wherein said second gas cushion recess second land transport means is, at least in its majority, retractable into the second gas cushion recess.

25. The advanced amphibious marine vehicle of claim 21 wherein said first gas cushion recess first land transport means retracts aft into the first gas cushion recess during high speed waterborne operation of the advanced amphibious marine vehicle.

26. The advanced amphibious marine vehicle of claim 21 wherein said first gas cushion recess first land transport means retracts forward into the first gas cushion recess during high speed waterborne operation of the advanced amphibious marine vehicle.

27. The advanced amphibious marine vehicle of claim 21 wherein said first gas cushion recess second land transport means retracts forward into the first gas cushion recess during high speed waterborne operation of the advanced amphibious marine vehicle.

28. The advanced amphibious marine vehicle of claim 21 wherein said first gas cushion recess first land transport means land contact means includes a track drive wherein said track drive makes land contact during beaching operation of the advanced amphibious marine vehicle.

29. The advanced amphibious marine vehicle of claim 21 wherein said first gas cushion recess first land transport means land contact means includes a tire that makes land contact during beaching operations of the advanced amphibious marine vehicle.

30. The advanced amphibious marine vehicle of claim 21 wherein the first gas cushion recess first land transport means is, at least partially, energized by power takeoff means from a first propulsion motor.

31. The advanced amphibious marine vehicle of claim 30 wherein the power takeoff means includes a hydraulic pressure generator.

32. The advanced amphibious marine vehicle of claim 21 wherein drive energy for the first gas cushion recess first land transport means is, at least in part, from a hydraulic motor disposed, at least in part, internal to the first gas cushion recess first land transport means.

33. The advanced amphibious marine vehicle of claim 21 wherein drive energy for the first gas cushion recess first land transport means includes a hydraulic drive motor wherein said hydraulic drive motor powers a track drive gear.

34. The advanced amphibious marine vehicle of claim 21 wherein drive energy for the first gas cushion recess first land transport means includes a hydraulic drive motor wherein said hydraulic drive motor powers a tire.

35. The advanced amphibious marine vehicle of claim 21 wherein said first gas cushion recess first land transport means is steerable.

36. The advanced amphibious marine vehicle of claim 21 wherein, during high speed operation with its first artificially pressurized gas cushion pressurized, said advanced amphibious marine vehicle is, at least in part, propelled by a first water propulsor energized with power supplied by a first propulsor motor and propelled when land borne, at least in part, by its first gas cushion recess first land transport means wherein said first gas cushion recess first land transport means is energized with power supplied by the first propulsor motor.

37. The advanced amphibious marine vehicle of claim 21 wherein a first propulsor motor drives a gearbox with output from said gearbox driving a water propulsor and a first hydraulic pressure generator that supplies hydraulic power to a first hydraulic drive blower motor when the advanced amphibious marine vehicle is waterborne and wherein said first hydraulic pressure generator supplies hydraulic power to drive a first gas cushion recess first land transport means hydraulic drive motor when the advanced amphibious marine vehicle is land borne.

38. The advanced amphibious marine vehicle of claim 21 wherein a portion of a boundary of the first gas cushion recess is composed of a moveable, in relation to a hull of the advanced amphibious marine vehicle, seal member.

39. The advanced amphibious marine vehicle of claim 38 wherein the moveable seal member is at least partially composed of flexible material.

40. In an advanced amphibious marine vehicle including an artificially pressurized gas cushion disposed in a gas cushion recess wherein said artificially pressurized gas cushion supports at least a portion of weight of the advanced amphibious marine vehicle when said advanced amphibious marine vehicle is moving forward at high speed on a water surface, the improvement comprising:

gas cushion recess first port side and first starboard side land transport means that, when the advanced amphibious marine vehicle is moving forward at high speed on a water surface with said artificially pressurized gas cushion pressurized, are at least in part retracted into the gas cushion recess to thereby reduce water contact of the gas cushion recess first port side and first starboard side land transport means and wherein said gas cushion recess first port side and first starboard side land transport means, when the advanced marine vehicle encounters a beachhead, are extendable downward to make land contact and thereby provide overland support for the advanced amphibious marine vehicle and wherein a portion of a boundary of the gas cushion recess is composed of a moveable, in relation to a hull of the advanced amphibious marine vehicle, seal member.

41. The advanced amphibious marine vehicle of claim 40 which further comprises gas cushion recess second port side and second starboard side land transport means.

42. The advanced amphibious marine vehicle of claim 40 wherein the gas cushion recess port side and starboard side land transport means are, at least partially, energized by power takeoff means from a propulsion system.

43. The advanced amphibious marine vehicle of claim 40 wherein the moveable seal member is at least partially composed of flexible material.

44. In an advanced amphibious marine vehicle and including a first artificially pressurized gas cushion disposed in a first gas cushion recess wherein said first artificially pressurized gas cushion supports at least a portion of weight of the advanced amphibious marine vehicle when said advanced amphibious marine vehicle is moving forward at high speed on a water surface, the improvement comprising:

a first gas cushion recess first land transport means that, when the advanced amphibious marine vehicle is moving forward at high speed on a water surface with said first artificially pressurized gas cushion pressurized, is at least in part retracted into the first gas cushion recess to thereby reduce water contact of the first gas cushion recess first land transport means and wherein said first gas cushion recess first land transport means, when the advanced marine vehicle encounters a beachhead, is extendable downward to make land contact and thereby provide overland support for the advanced amphibious marine vehicle and wherein said first gas cushion recess first land transport means includes a track drive means wherein said track drive means makes land contact during beaching operation of the advanced amphibious marine vehicle.

45. The advanced amphibious marine vehicle of claim 44 which further comprises a first gas cushion second land transport means that, when the advanced amphibious marine vehicle is moving forward at high speed on a water surface with said first artificially pressurized gas cushion pressurized, is at least in part retracted into the first gas cushion recess to thereby reduce water contact of the first gas cushion recess second land transport means and wherein said first gas cushion recess second land transport means, when the advanced amphibious marine vehicle encounters a beachhead, is extendable downward to make land contact and thereby provide overland support for the advanced amphibious marine vehicle.

46. The advanced amphibious marine vehicle of claim 44 wherein said first gas cushion recess first land transport means retracts aft into the first gas cushion recess during high speed waterborne operation of the advanced amphibious marine vehicle.

47. The advanced amphibious marine vehicle of claim 44 wherein said first gas cushion recess first land transport means retracts forward into the first gas cushion recess during high speed waterborne operation of the advanced amphibious marine vehicle.

48. The advanced amphibious marine vehicle of claim 44 wherein drive energy for the first gas cushion recess first land transport means includes a hydraulic drive motor.

49. The advanced amphibious marine vehicle of claim 44 wherein the first gas cushion recess first land transport means is, at least partially, energized by power takeoff means from a first marine propulsion system.

50. The advanced amphibious marine vehicle of claim 44 wherein the power takeoff means includes a hydraulic pressure generator.

51. The advanced amphibious marine vehicle of claim 44 wherein, during high speed waterborne operation with its first artificially pressurized gas cushion pressurized, said advanced amphibious marine vehicle is, at least in part, propelled by a first water propulsor energized with power supplied by a first propulsor motor and propelled when land borne, at least in part, by its first gas cushion recess first land transport means wherein said first gas cushion recess first land transport means is energized with power supplied by the first propulsor motor.

52. The advanced amphibious marine vehicle of claim 44 wherein a first propulsor motor drives a gearbox with output from said gearbox driving a first water propulsor and a first hydraulic pressure generator that supplies hydraulic power to a gas cushion pressurizing blower hydraulic drive motor when the advanced amphibious marine vehicle is waterborne and wherein said first hydraulic pressure generator supplies hydraulic power to drive a first gas cushion recess first land transport means hydraulic drive motor when the advanced amphibious marine vehicle is land borne.

53. The advanced amphibious marine vehicle of claim 44 wherein attachment arms are disposed either side of the first gas cushion recess first land transport means.

54. The advanced amphibious marine vehicle of claim 44 wherein a portion of a boundary of the first gas cushion recess is composed of a moveable, in relation to a hull of the advanced amphibious marine vehicle, seal member.

55. The advanced amphibious marine vehicle of claim 44 which further comprises a first gas cushion recess third land transport means that, when the advanced amphibious marine vehicle is moving forward at high speed on a water surface with said first artificially pressurized gas cushion pressurized, is at least in part retracted into the first gas cushion recess to thereby reduce water contact of the first gas cushion recess third land transport means and wherein said first gas cushion recess third land transport means, when the advanced marine vehicle encounters a beachhead, is extendable downward to make land contact and thereby provide overland support for the advanced amphibious marine vehicle.

56. The advanced amphibious marine vehicle of claim 44 which further comprises a first gas cushion recess fourth land transport means that, when the advanced amphibious marine vehicle is moving forward at high speed on a water surface with said first artificially pressurized gas cushion pressurized, is at least in part retracted into the first gas cushion recess to thereby reduce water contact of the first gas cushion recess fourth land transport means and wherein said first gas cushion fourth land transport means, when the advanced marine vehicle encounters a beachhead, is extendable downward to make land contact and thereby provide overland support for the advanced amphibious marine vehicle.

* * * * *